United States Patent Office 2,694,729
Patented Nov. 16, 1954

2,694,729

PROCESS OF PREPARING 2,2',4,4'-TETRAHYDROXYBENZOPHENONE

Robert W. Wynn and Paul E. Hoch, Easton, Pa., assignors to General Aniline & Film Corporation, New York, N. Y., a corporation of Delaware No Drawing. Application September 7, 1951, Serial No. 245,641

2 Claims. (Cl. 260—591)

This invention relates to 2,2',4,4'-tetrahydroxybenzophenone and particularly to an improved process of preparing the same.

2,2',4,4'-tetrahydroxybenzophenone was first prepared by Meyer and Conzetti (Ber., 30, 971, 1897) by fusing fluorescein chloride with caustic soda at 270–280° C. The yield obtained was minutely small. The compound was also prepared by condensing 2,4-diacetoxybenzonitrile and resorcinol in the presence of hydrochloric acid and zinc chloride to 2,4-diacetoxy-2',4'-dihydroxybenzophenoneimine hydrochloride which is then hydrolyzed in acid solution to the benzophenone. The compound was also reportedly prepared from $\beta$-resorcylic acid and resorcinol by zinc chloride fusion, by Russel and Butler (J. A. C. S. 71, 3663, 1949).

All of the foregoing methods are time consuming, give very low yields, and utilize expensive and unavailable chemical reagents.

We have found that 2,2',4,4'-tetrahydroxybenzophenone can be readily prepared in excellent yields from commercially available chemicals by condensing resorcinol dimethyl ether with phosgene in the presence of anhydrous aluminum chloride and in the presence of a suitable solvent, such as chlorinated hydrocarbon of the aliphatic and benzene series. We have found that by the use of as little as 2 moles of aluminum chloride in the presence of 1 mole of phosgene and 2 moles of resorcinol dimethyl ether, 2,2',4,4'-tetrahydroxybenzophenone is obtained in yields ranging from 20 to 25%.

We have further found from our experimental work in the preparation of this compound that the aluminum chloride which forms complexes with the hydroxybenzophenone intermediates is either not as tightly bound as would be expected and is free to act catalytically as a demethylating agent or the complex itself can act catalytically in the demethylation of the ether. This is wholly surprising and unexpected in view of the condensation reactions utilizing aluminum chloride as a catalyst.

We have found that greater yields are obtained, ranging from 35 to 40%, by conducting the condensation reaction in an alkyl halide at a temperature ranging between 60 and 75° C. with 3 moles of aluminum chloride. Good yields are also obtained while utilizing 2 to 4 moles of aluminum chloride at temperatures from 20–100° C. Utilizing larger amounts of aluminum chloride results in excessive tar formation.

It is an object of the present invention to provide an improved method of preparing 2,2',4,4'-tetrahydroxybenzophenone which is particularly useful as an ultraviolet absorbing agent.

Other objects and advantages will become apparent from the foregoing description.

In practicing the invention, 1 mole of phosgene is charged into a reaction vessel, preferably a 3-necked flask, containing about 15 parts by volume of a chlorinated hydrocarbon of the aliphatic or benzene series, based on the volume of the phosgene charged, and 1 mole of aluminum chloride at a temperature ranging from 30–40° C. Resorcinol dimethyl ether is added dropwise over a 20–45 minute period. The mixture is then heated to 65–80° C. for 2 hours, then allowed to cool to 40° C., and 1 to 3 moles, preferably 2 moles, of aluminum chloride added. The contents are then heated to 60–70° C. for 8½ hours. The contents of the reaction vessel are then drowned in ice cold dilute hydrochloric solution and the solid material filtered off. The organic layer is then separated from the rest of the filtrate and both this and the solid material filtered off are steam distilled to remove the chlorinated solvent and unreacted resorcinol dimethyl ether. To the residue of the distillation is added an aqueous solution of approximately 20% sodium hydroxide, and steam distillation resumed to remove the last traces of resorcinol dimethyl ether. The basic solution is cooled to room temperature and filtered. It is then added dropwise to ice cold 6 N hydrochloric acid. The crude product is collected and extracted with several portions of boiling water. Each of the hot extracts is treated with a decolorizing carbon, such as Norite or Nuchar, and filtered. The extracts are then cooled in an ice bath and the precipitates collected which consist of the final product.

As examples of suitable chlorinated hydrocarbons of the aliphatic and aromatic series which may be utilized as the solvent in the foregoing reaction, the following may be mentioned:

Ethylene chloride
1,3-dichloropropane
Chlorobenzene
Benzyl chloride

Our improved process will be more fully described in conjunction with the following example. It is to be noted, however, that this example is given by way of illustration and the invention is not to be limited by the details set forth therein.

Example

Into a 500 cc., 3-necked flask there are charged 200 cc. of dry ethylene dichloride, 13 grams of phosgene, and 15 grams of anhydrous aluminum chloride. At 35° C. there are added dropwise 27.6 grams of resorcinol dimethyl ether over a 30-minute period. The mixture is then heated to 70–75° C. for 2 hours. It is then allowed to cool to 40° C. and 30 grams of anhydrous aluminum chloride added. The contents are heated to 65–70° C. for 8½ hours.

The contents of the flask are drowned in 500 grams of an ice cold dilute hydrochloric acid solution and the solid material filtered off. The organic layer is separated from the rest of the filtrate and both this and the solid material filtered off are placed in a flask and steam distilled to remove the solvent and unreacted resorcinol dimethyl ether.

To the residue in the flask are added 10 grams of sodium hydroxide pellets dissolved in 50 cc. of water. Steam distillation is resumed to remove the last traces of resorcinol dimethyl ether. The basic solution in the flask is cooled to room temperature and filtered. It is then added dropwise to 100 cc. of ice cold 6 N hydrochloric acid. The crude product is collected and extracted with two 250 cc. portions of boiling water. Each of the hot extracts is treated with Norite and filtered. They are then cooled in an ice bath and the precipitates collected. The combined precipitates weigh 10 grams. By one recrystallization from water there are obtained 7 grams of a product melting at 187–193° C. The material shows no depression in melting point on mixing with an authentic sample of 2,2',4,4'-tetrahydroxybenzophenone.

While we have disclosed the preferred embodiments of our invention and the preferred modes of carrying the same into effect, it will be readily apparent to those skilled in this art that many variations may be made therein without departing from the spirit thereof. Accordingly, the scope of our invention is to be limited solely by the following claims.

We claim:

1. The process of preparing 2,2',4,4'-tetrahydroxybenzophenone which comprises dropwise addition of 2 moles of resorcinol dimethyl ether to a mixture of 1 mole of phosgene and 1 mole of aluminum chloride, in the presence of a chlorinated hydrocarbon selected from the class consisting of aliphatic and aromatic chlorides, at a temperature ranging from 30–40° C., heating the mixture to 65–80° C. followed by cooling to 40° C. and adding 2 to 3 moles of aluminum chloride, heating the mixture to 60–70° C., treating it with aqueous dilute hydrochloric acid and isolating the 2,2′,4,4′-tetrahydroxybenzophenone by filtration.

2. The process according to claim 1 wherein the aliphatic chloride is ethylene dichloride.

References Cited in the file of this patent

Staudinger et al., "Helvet. Chim. Acta," vol. 4, pages 334–341, 1921.

Beilstein, "Handbuch der org. Chem.," 4th ed., vol. II, page 542, supplement 2, page 509.

Wilson et al., "Ind. and Eng. Chem.," vol. 14 (1922), pages 406–409.